United States Patent
Bhalla et al.

(10) Patent No.: US 7,515,784 B2
(45) Date of Patent: *Apr. 7, 2009

(54) FIELD RECONFIGURABLE LINE CARDS FOR AN OPTICAL TRANSPORT SYSTEM

(75) Inventors: Ketan Bhalla, Ottawa (CA); Andre Lortie, Quebec (CA); Kyle Edginton, Nepean (CA); James Moser, Ottawa (CA); Gamal Refai-Ahmed, Ottawa (CA); Marc Nadeau, Kanata (CA); Ross Saunders, Ottawa (CA); Lee Shyue Choong, Ottawa (CA)

(73) Assignee: Altera Corporation, San Jose, CA (US)

( * ) Notice: Subject to any disclaimer, the term of this patent is extended or adjusted under 35 U.S.C. 154(b) by 750 days.

This patent is subject to a terminal disclaimer.

(21) Appl. No.: 11/110,604

(22) Filed: Apr. 20, 2005

(65) Prior Publication Data

US 2005/0185961 A1    Aug. 25, 2005

Related U.S. Application Data

(63) Continuation of application No. 10/269,356, filed on Oct. 11, 2002, now Pat. No. 6,915,036.

(60) Provisional application No. 60/353,292, filed on Oct. 25, 2001.

(51) Int. Cl.
    *G02B 6/28* (2006.01)
(52) U.S. Cl. .......................................... 385/24; 385/15
(58) Field of Classification Search ................... 385/15, 385/16, 17, 24, 28, 31
    See application file for complete search history.

(56) References Cited

U.S. PATENT DOCUMENTS

| 5,487,120 | A | 1/1996 | Choy et al. |
| 5,793,919 | A | 8/1998 | Payne et al. |
| 5,848,065 | A | 12/1998 | Gorshe et al. |
| 5,878,039 | A | 3/1999 | Gorshe et al. |
| 5,898,801 | A | 4/1999 | Braun et al. |
| 6,915,036 | B2 * | 7/2005 | Bhalla et al. .................. 385/24 |

FOREIGN PATENT DOCUMENTS

| WO | WO 01/47159 A1 | 6/2001 |
| WO | WO 02/054821 A2 | 7/2002 |

* cited by examiner

*Primary Examiner*—Daniel St.Cyr
(74) *Attorney, Agent, or Firm*—Harness, Dickey & Pierce, P.L.C.

(57) ABSTRACT

A field reconfigurable muxponder for use in an optical transport system. The muxponder includes one or more tributary cards, where each tributary card is adapted to receive an optical data signal and conditions the optical data signal into an intermediate data signal constituted in accordance with a tributary interface format. In this way, the muxponder is able to aggregate optical data signals having different protocols and/or different data rates. The muxponder further includes a chassis that is adapted to receive a predefined number of tributary cards and outputs an optical system signal independently from the availability of the optical data signals from the tributary cards. The tributary cards and the chassis integrally form one line card.

16 Claims, 5 Drawing Sheets

FIELD RECONFIGURABLE LINE CARDS FOR AN OPTICAL TRANSPORT SYSTEM

CROSS-REFERENCE TO RELATED APPLICATIONS

This application is a continuation of U.S. patent application Ser. No. 10/269,356 filed on Oct. 11, 2002 now U.S. Pat. No. 6,915,036 which claims the benefit of U.S. Provisional Application Ser. No. 60/353,292 filed on Oct. 25, 2001. The disclosure of the above application is incorporated herein by reference.

FIELD OF THE INVENTION

The present invention relates generally to field reconfigurable line cards for an optical transport system and, more particularly, to a line card that aggregates multiple clients signals and can be reconfigured to support a varying mix of clients signals based on modular client-specific transceiver cards.

BACKGROUND OF THE INVENTION

Wavelength division multiplexing (WDM) is an optical technology that aggregates many wavelengths for transmission on the same fiber. To maximize bandwidth usage, lower bit rate data signals are often aggregated onto each wavelength. However, conventional architectures do not facilitate cost effective use of the entire available bandwidth.

Optical transport systems typically employ line cards adapted to receive one or more client input signals and output an optical transport signal. In such known architectures, each line card is designed for a specific type of protocol or data rate. In other words, architectures having different configurations require the use of different types of line cards. It should also be noted that client input signals having different protocols and/or different data rates are typically transmitted on different wavelengths.

Therefore, it is desirable to provide a line card that aggregates client signals having different protocols and/or different data rates. The line card should be in-service reconfigurable via the use of modular client-specific tributary cards that are accessible from the front panel of the line card. Since tributary cards can be modularly built using different transceivers, service providers can reduce line card inventory levels. It is also advantageous for the line card to asynchronously output an optical system signal independently from the availability of client signal. In this way, the client-specific tributary cards may be hot-swappable without affecting the transmission of the optical system signal.

SUMMARY OF THE INVENTION

In accordance with the present invention, a field reconfigurable line card is provided for use in optical transport systems. The field reconfigurable muxponder includes one or more tributary cards, where each tributary card is adapted to receive an optical data signal and conditions the optical data signal into an intermediate data signal constituted in accordance with a tributary interface format. In this way, the muxponder is able to aggregate optical data signals having different protocols and/or different data rates. The muxponder further includes a chassis that is adapted to receive a predefined number of tributary cards and outputs an optical system signal independently from the availability of the optical data signals from the tributary cards. The tributary cards and the chassis integrally form one line card.

For a more complete understanding of the invention, its objects and advantages, reference may be had to the following specification and to the accompanying drawings.

DETAILED DESCRIPTION OF THE PREFERRED EMBODIMENTS

Figure 1:
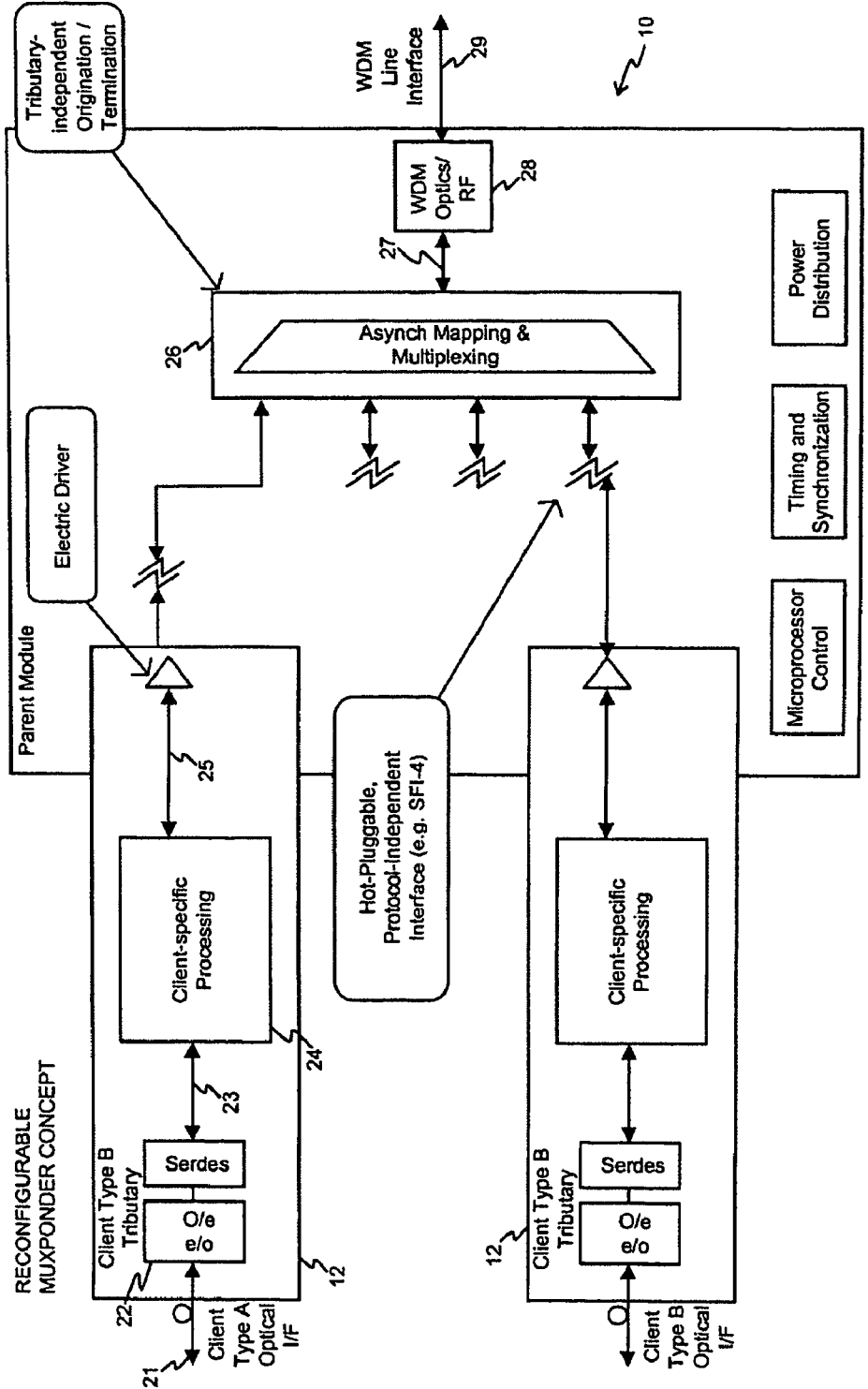
FIG. 1 is a block diagram depicting a field reconfigurable muxponder in accordance with the present invention.

FIG. 1 illustrates the functional concept of a field reconfigurable muxponder 10. The muxponder 10 is comprised of one or more tributary cards 12 and a chassis 14. Each tributary card 12 is adapted to receive an optical data signal and operates to condition the optical data signal into an intermediate data signal having a protocol-independent format. The chassis 14 is adapted to receive the tributary cards 12 and operates to output an optical system signal that embodies each of the intermediate data signals. It should be noted that the tributary cards 12 and the chassis 14 are preferably integral to a single line card.

Each tributary card 12 may be configured to support optical data signals having different client protocols and/or different data rates. To do so, each tributary card 12 further includes a transceiver component 22 and a protocol-specific component 24. In operation, the transceiver component 22 receives an optical data signal 21 and converts the optical data signal 21 into an electrical data signal 23. The protocol-specific component 24 in turn receives electrical signal 23 and conditions the electrical signal into an intermediate electrical data signal 25 which is constituted in accordance with a standard tributary interface format.

The chassis 14 houses the electrical and optical circuitry needed to receive the various intermediate data signals 25 from the tributary cards 12 and to generate an optical system signal which may be launched into an optical transport system. Of particular interest, the chassis 14 includes a multiplexing component 26 and a transceiver component 28. The multiplexing component 26 receives the intermediate electrical data signals 25 and combines these signals into an electrical system signal 27. Although time domain multiplexing is presently preferred, other multiplexing schemes are also within the scope of the present invention. The transceiver component 28 then converts the electrical system signal 27 into an optical system signal 29 which may be launched at a predefined wavelength into an optical transport line. It is readily understood that the chassis 14 further includes other functional aspects, such as microprocessor control, timing and synchronization, and power distribution. Although the muxponder 10 has been described in terms of unidirectional network traffic, one skilled in the art will readily recognize that the muxponder 10 may support bidirectional network traffic.

The field reconfigurable aspects of the present invention are enabled by three important features. First, the muxponder is able to aggregate client signals having different protocols and/or different data rates. Second, the tributary cards may be hot swapped without disturbing the network traffic of the other tributary cards. Third, the muxponder is able to asynchronously output an optical system signal independently from the availability of client signals from the tributary cards.

Figure 2:
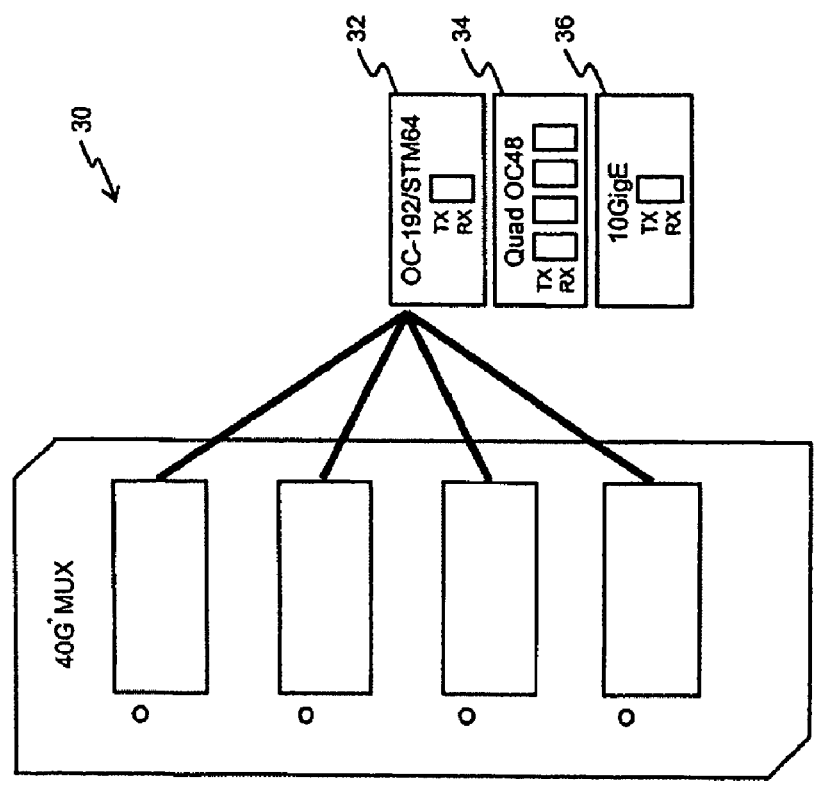
FIG. 2 is a diagram illustrates the aggregation of mixed client signals by the muxponder of the present invention.

FIG. 2 illustrates the aggregation of mixed client signals by an exemplary muxponder 30. For illustration purposes, the muxponder 30 is a 40 Gbps line card having four 10 Gbps client slots. While the following description is provided with reference to a particular muxponder, it is readily understood that other muxponders may be designed to support different data rates (e.g., 10 Gbps line card having four 2.5 Gbps client slots) as well as provide more or less client slots.

Although not limited thereto, the muxponder 30 may accept any of three different types of client modules: OC-192 module 32, Quad OC-48 module 34, or 10GbE module 36. In one example, a OC-192 module may be plugged into each of the available client slots of the muxponder 30. In another example, a Quad OC-48 module, a 10GbE module and two OC-192 modules are plugged into the four available client slots of the muxponder 30. It is readily understood that the muxponder 30 may accept other unique combinations of these client modules or other known types of client modules. It is also understood that not all of the client slots need to be filled with client modules, and yet the muxponder is operable to output an optical system signal. Regardless of the combination employed, the muxponder 30 is able to aggregate client signals having different protocols and/or different data rates into a signal optical system signal which may be launched into an optical transport system.

Figure 3:
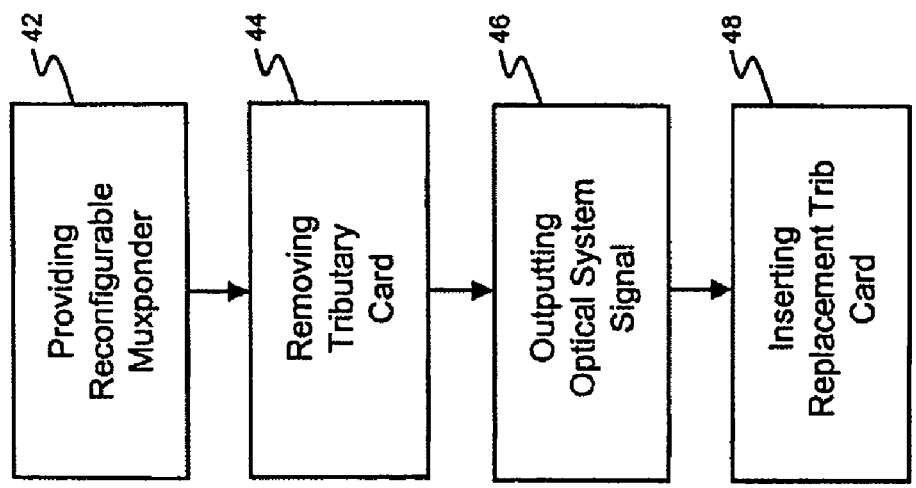
FIG. 3 is a flowchart illustrating an exemplary method for field reconfiguring a muxponder of the present invention.

FIG. 3 illustrates a method for field reconfiguring a muxponder in accordance with the present invention. Briefly, the method is applicable to a muxponder having a least one tributary card operably connected to a chassis as shown at 42. The muxponder may be reconfigured in the field by removing one or more tributary cards from the chassis as shown at 44 and inserting a replacement tributary card(s) into the chassis as shown at 48. Alternatively, it is envisioned that only a transceiver component on a given tributary card may be replaced on the muxponder. As noted above, the muxponder is operable to output an optical system signal independently from the availability of client signals which are received via the tributary cards. Thus, an optical system signal may be output by the chassis when one or more of the tributary cards are removed from the chassis as shown at 46. In this way, the muxponder may be reconfigured to support client data signal having different protocols and different data rates without affecting the transmission of the optical system signal output by the muxponder.

Figure 4:
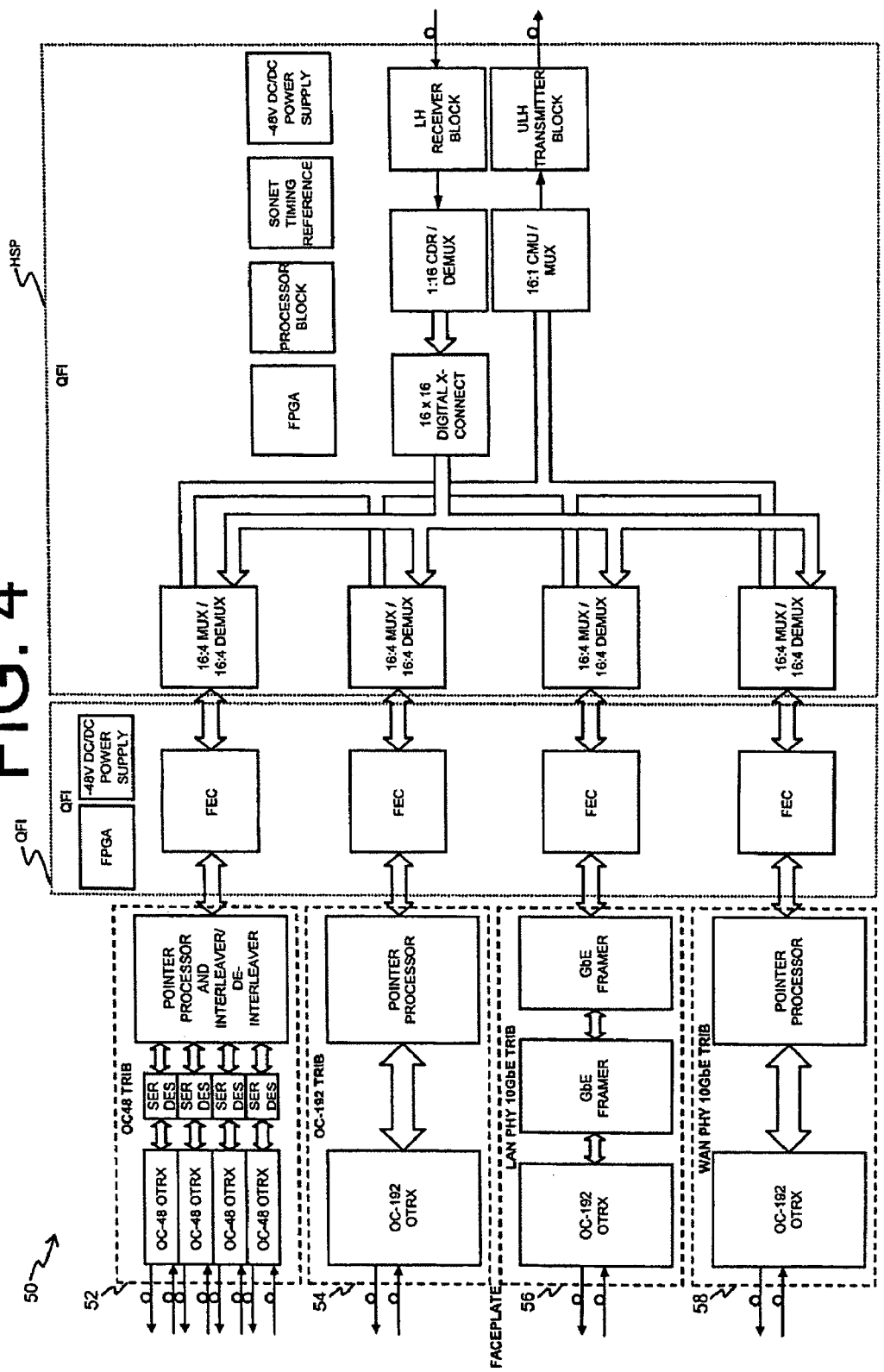
FIG. 4 is a block diagram depicting an exemplary embodiment of a field reconfigurable muxponder in accordance with the present invention.

A specific implementation of an exemplary muxponder 50 in accordance with the present invention is depicted in FIG. 4. Four types of tributary cards are shown: a quad-OC48 card 52 (which supports four 2.488 Gbps signals), a single OC-192 card 54 (supports a 9.95328 Gbps signal), a LAN PHY 10GE card 56 (supports a 10.3125 Gbps signal), and a WAN PHY 10GE card 58 (supports a 9.95328 Gbps). Each tributary card has client-specific short-reach optical transceivers which are designated by OTRX, and client-specific electrical protocol processing integrated circuits (ICs). The optical transceivers OTRX are responsible for optical to electrical conversions and vice-versa; whereas the ICs adapt the converted client signals to a common tributary interface format. In this embodiment, the tributary interface format is the Optical Internetworking Forum's OIF SFI-4 standard specified as a 16-bit bidirectional LVDS interface running at 622.08 Mbps each, or a unidirectional interface rate of 9.95328 Gbps.

The chassis 60 is configured to accept 0 to 4 SFI-4 interfaces from the tributary side. The chassis 60 is comprised of a Quad-FEC Interface circuit pack QFI and a high-speed platform circuit pack HSP. The QFI circuit pack is responsible for wrapping the SFI-4 signals into the payload of a higher-rate standards-compliant G.709 OTN signal having a 10.709 Gbps data rate. It is understood that the G.709 OTN signal includes forward error correction data to correct for bit errors which may occur during transmission. In the absence of a tributary card, the OTN signal is internally generated by the QFI circuit pack with a deterministic payload called the "client surrogate". This allows the optical wavelength to operate independent of the presence of the tributaries.

The HSP circuit pack is responsible for time-domain multiplexing (TDM) the four 10 Gbps signals provided by the QFI circuit pack up to 40 Gbps. The HSP implementation shown performs TDM in two stages. The HSP circuit pack is also responsible for electrical to optical conversion (and vice-versa) for long-reach optical transmission. By choosing components that support a hot-swappable SFI-4 interface, electrical hot-swappability of tributary cards is maintained by the muxponder.

Figure 5:
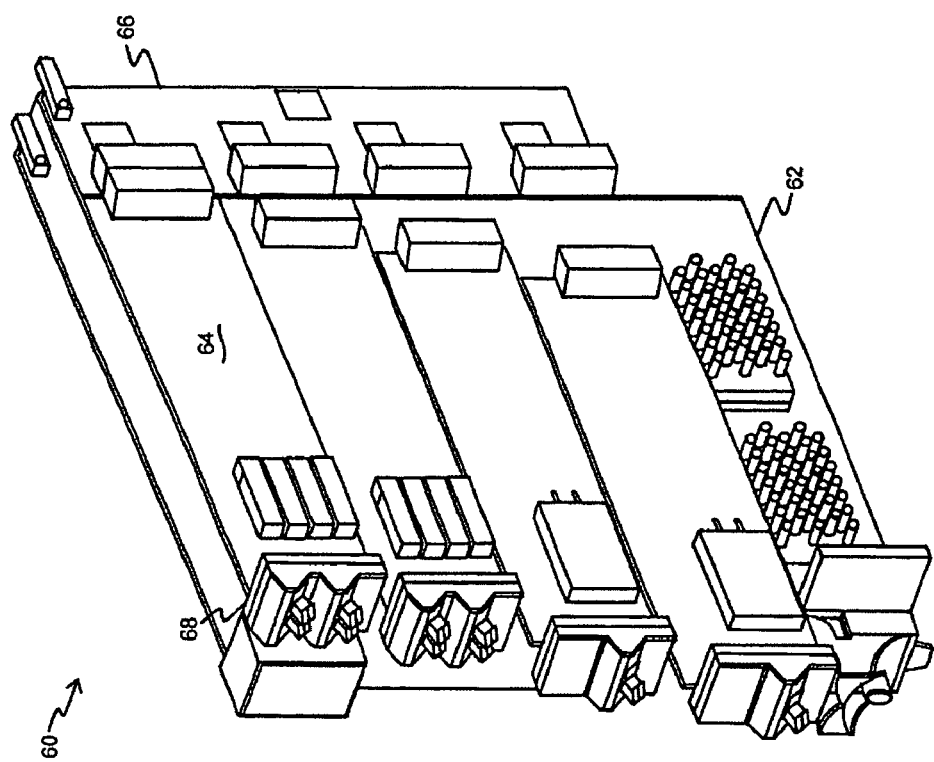
FIG. 5 is a diagram illustrating an exemplary mechanical implementation of the field reconfigurable muxponder of the present invention.

FIG. 5 illustrates an exemplary mechanical implementation of the field reconfigurable muxponder 60 of the present invention. The muxponder 60 is primarily comprised of a motherboard 62 (e.g., the HSP in FIG. 4) which provides the supporting frame structure for one or more tributary cards 64. The tributary cards 64 are operably connected via card slots provided on the faceplate of the motherboard 60. The tributary cards 64 plug into a mezzanine card 66 (e.g., the QFI in FIG. 4) at the back of the motherboard 62. In addition, each tributary card 64 includes a fully gasketed faceplate 68 that facilitates insertion and extraction of the card.

While the invention has been described in its presently preferred form, it will be understood that the invention is capable of modification without departing from the spirit of the invention as set forth in the appended claims.

What is claimed is:

1. A field reconfigurable muxponder for use in an optical transport system, comprising:

two or more tributary cards, each tributary card adapted to receive an optical data signal and operable to condition the optical data signal into an intermediate data signal constituted in accordance with a tributary interface format; and a multiplexing component adapted to receive the intermediate data signals from the tributary cards and operable to combine the intermediate data signals into a single optical system signal which is launched at a predefined wavelength into an optical transport line wherein the tributary cards and the multiplexing component are integral to one line card.

2. The field reconfigurable muxponder of claim 1 wherein each tributary card further comprises a transceiver component adapted to receive the optical data signal and operable to convert the optical data signal into an electrical data signal, and a protocol-specific component adapted to receive the electrical signal and operable to condition the electrical signal into an intermediate data signal.

3. The field reconfigurable muxponder of claim 2 wherein the multiplexing component adapted to receive the intermediate data signals from the tributary cards and is operable to combine the intermediate data signals into an electrical system signal.

4. The field reconfigurable muxponder of claim 3 wherein the multiplexing component combines the intermediate data signals using a time-domain multiplexing scheme.

5. The field reconfigurable muxponder of claim 3 further comprises a transceiver component adapted to receive the electrical system signal and to convert the electrical system signal into the optical system signal which may be launched at a predefined wavelength into the optical transport system.

6. The field reconfigurable muxponder of claim 1 wherein the tributary interface format is further defined as an Optical Internetworking Forum (OIF) SFI-4 standard.

7. A field reconfigurable muxponder for use in an optical transport system, comprising:
 a first tributary card adapted to receive a first optical data signal constituted in accordance with a first protocol and operable to condition the first optical data signal into a first intermediate data signal constituted in accordance with a tributary interface format,
 a second tributary card adapted to receive a second optical data signal constituted in accordance with a second protocol that is different than the first protocol, and operable to condition the second optical data signal into a second intermediate data signal constituted in accordance with the tributary interface format;
 a multiplexing component adapted to receive the first and second intermediate data signals and operable to combine the first and second intermediate data signals into an electrical system signal, and a transceiver component adapted to receive the electrical system signals and operable to convert the electrical system signal into an optical system signal which is launched at a predefined wavelength into an optical transport line; and
 a chassis adapted to receive the first and second tributary cards and operable to output the optical system signal that embodies the first and second intermediate data signals.

8. The field reconfigurable muxponder of claim 7 wherein each of the first and second tributary cards operably connected via a card slot to the chassis.

9. The field reconfigurable muxponder of claim 7 wherein at least one of the first and second tributary card is adapted to receive one or more optical fiber cables on an accessible faceplate thereof.

10. The field reconfigurable muxponder of claim 7 wherein the first tributary card further comprises a transceiver component adapted to receive the first optical data signal and operable to convert the first optical data signal into a first electrical data signal, and a protocol-specific component adapted to receive the first electrical signal and operable to condition the first electrical signal into a first intermediate data signal.

11. The field reconfigurable muxponder of claim 7 wherein the tributary interface format is further defined as an Optical Internetworking Forum (OIF) SFI-4 standard.

12. A method for field reconfiguring a muxponder residing in an optical transport system, comprising:
 providing at least one swappable tributary card operably connected to a chassis, thereby forming a field reconfigurable muxponder;
 removing the swappable tributary card from the chassis, where the swappable tributary card is adapted to receive an optical data signal constituted in accordance with a first protocol; and
 inserting a replacement swappable tributary card into the chassis, where the replacement swappable tributary card is adapted to receive an optical data signal constituted in accordance with a second protocol.

13. The method of claim 12 further comprises generating an optical system signal that embodies the optical data signal received by the chassis.

14. The method of claim 12 further comprises outputting an optical system signal from the chassis when the swappable tributary card is removed from the chassis.

15. The method of claim 12 wherein the swappable tributary card is operable to condition the optical data signal into an intermediate data signal constituted in accordance with a tributary interface format.

16. The method of claim 15 wherein the chassis is adapted to receive the optical data signal from the swappable tributary card and operable to output an optical system signal that embodies the intermediate data signal.

* * * * *